(12) United States Patent
Hare et al.

(10) Patent No.: US 6,353,860 B1
(45) Date of Patent: Mar. 5, 2002

(54) METHODS AND APPARATUS FOR MANAGING COLLECTIONS OF OBJECTS

(75) Inventors: Dwight F. Hare, La Selva Beach; Robert B. Hagmann, Palo Alto; Michael L. Powell, Palo Alto; Alan Snyder, Palo Alto; Peter Vanderbilt, Mountain View, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/996,784

(22) Filed: Dec. 23, 1997

Related U.S. Application Data

(63) Continuation of application No. 08/408,317, filed on Mar. 22, 1995.

(51) Int. Cl.$^7$ .................................................. G06F 9/54

(52) U.S. Cl. ...................................................... 709/316

(58) Field of Search ................................ 709/310–332; 707/203, 8

(56) References Cited

U.S. PATENT DOCUMENTS

| | | | |
|---|---|---|---|
| 5,245,608 A | | 9/1993 | Deaton, Jr. et al. .......... 370/469 |
| 5,432,936 A | | 7/1995 | Gray et al. ...................... 715/5 |
| 5,481,721 A | | 1/1996 | Serlet et al. ................. 709/315 |
| 5,499,365 A | * | 3/1996 | Anderson et al. ............ 707/203 |
| 5,504,895 A | * | 4/1996 | Kurosawa et al. .............. 707/8 |
| 5,515,536 A | | 5/1996 | Corbett et al. ............... 709/315 |
| 5,519,875 A | | 5/1996 | Yokoyama et al. .......... 709/316 |
| 5,560,005 A | | 9/1996 | Hoover et al. ................. 707/10 |
| 5,603,030 A | | 2/1997 | Gray et al. ...................... 717/5 |
| 5,617,569 A | | 4/1997 | Gray et al. ................... 707/103 |
| 5,734,902 A | * | 3/1998 | Atkins et al. ................ 709/316 |
| 5,832,268 A | * | 11/1998 | Anderson et al. ........... 709/316 |

OTHER PUBLICATIONS

Shimizu et al., "Hierarchical Object Groups in Distributed Operating Systems", 1988, The 8th International Conference on Distributed Computing Systems, IEEE.

(List continued on next page.)

Primary Examiner—St. John Courtenay, III
(74) Attorney, Agent, or Firm—Beyer Weaver & Thomas, LLP

(57) ABSTRACT

A variety of methods, apparatus and data structures for managing collections of objects are described. In one aspect of the invention, an object that is intended for use in a distributed object operating environment has a structure including a group designation, a co-activation designation and a co-process designation. The group designation is arranged to identify a group to which the object belongs. The group is defined as a collection of objects which share a common persistent state. The co-activation designation is arranged to identify a co-activation set to which the object belongs. The co-activation set is a collection of objects which are to be activated at the same time. The co-process designation is arranged to identify a co-process set to which the object belongs. The co-process set is a collection of objects which are to be activated within a single process. A various embodiments, a variety of methods of utilizing one or more of these designations to facilitate efficient operation of a distributed computing system are also described. In some applications, a particular object may be conceptually divided into a plurality of sub-objects, with each sub-object having its own portion of persistent memory. In this embodiment, the particular object may only be invoked as a whole, but the object is provided with a mechanism for accessing the selected sub-object in response to a call from a client object that invokes the object and identifies the sub-object in a sub-object field of an object reference that refers to the object. When sub-objects are use, the object references may be arranged to include a host identifier, an object identifier and a sub-object field.

32 Claims, 8 Drawing Sheets

OTHER PUBLICATIONS

Tripathi et al., "Management of Persistent Objects in the Nexus Distributed System", 1992, IEEE.

Madany et al., "Organizing and Typing Persistent Objects within Object–Oriented Framework", 1992, IEEE.

Cammarata et a., PSE: an object–oriented simulation environment supporting persistence, JOOP, pp. 30–40, Oct. 1991.*

Orfali et al., "Client/Server Programming with CORBA Objects," OS/2 Magazine, pp(6), Sep. 1994.*

* cited by examiner

METHODS AND APPARATUS FOR MANAGING COLLECTIONS OF OBJECTS

This is a Continuation application of copending prior application Ser. No. 08/408,317 filed on Mar. 22, 1995 the disclosure of which is incorporated herein by reference.

BACKGROUND OF THE INVENTION

The present invention relates to the fields of distributed computing systems, client-server computing and object-oriented programming. More specifically, the present invention teaches methods, apparatus and data structures for managing collections of related objects.

Object oriented programming methodologies have received increasing attention over the past several years in response to the increasing tendency for software developed using traditional programming methods to be delivered late and over budget. This stems from the fact that traditional programming techniques that emphasize procedural models and "linear" code tend to be difficult to design and maintain in many circumstances. Generally, large programs created using traditional methods are "brittle". That is, even small changes can effect numerous elements of the programming code. Thus, minor changes made to the software in response to user demands can require major redesign and rewriting of the entire program.

Object oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and or procedures of the object are relatively isolated from the remainder of the program. This provides code that is more easily maintained as compared to code written using traditional methods, as changes to an object's code do not affect the code in the other objects. In addition, the inherent modular nature of objects allows individual objects to be reused in different programs. Thus, programmers can develop libraries of "tried and true" objects that can be used over and over again in different applications. This increases software reliability while decreasing development time, as reliable programming code may be used repeatedly.

However, the full promise of object oriented methodologies, especially the advantages afforded by their modularity, have yet to be achieved. A basic goal of modular systems is to provide efficient utilization of resources, yet, due to the modularity of objects, there exists an inherent potential for redundant resources and overlap in functionality. As a first example, imagine a scenario wherein two text objects (e.g. word processing documents) contain similar or identical data such as text formatting information or portions of the actual text. In this first commonplace example there is an inherent redundancy as separate objects contain identical portions of data.

In order to present additional example of the disadvantages of current distributed object operating environments, some further background discussion will now be presented. In general, distributed objects are resident in computer processes executing on computer systems. As is well known to those skilled in the art, computer processes provide a common framework under which computer systems function. By way of analogy, a computer process may be thought of as a domain within a computer system.

In actuality, a computer process typically includes an address space (i.e. a portion of memory allocated to only the process), a set of file descriptors, a process identification number, and one or more threads of execution (often referred to as threads). As is familiar to those skilled in the art, a single thread of execution is essentially a sequential flow of the point of execution through a process. Multi-threaded systems allow for multiple threads to run concurrently in a single process. For a more detailed description of threads, multithreaded processes, and principles of concurrency, please see "Concurrency Within DOE Object Implementations" by Dr. Robert Hagmann, Version 0.91, May 27, 1993, published by SunSoft and incorporated herein by reference in its entirety. For another detailed description, please see "Multithreaded Programming Guide" published 1994 by SunSoft and incorporated herein by reference in its entirety.

As a direct result of the framework of computer processes, all entities residing under a single process will share resources (i.e. memory and files). Thus multiple target objects residing in a single process will have efficient communication with one another.

Furthermore, data can be loaded into memory that all objects residing in the single process will have access to. However, programmers may have other motivations (beyond efficient transport and data sharing) which negate the advantages gained by having many objects in a single process. For instance, different objects will have different objectives and may rely on different assumptions about the process. Programmers must be able to keep objects within separate processes, thereby preventing conflict between and maintaining the integrity of objects within separate processes. As a case in point, an object in a first server process may go into an error condition and begin chaotically writing within its server process memory. Nevertheless, objects running in separate server processes will remain intact since these processes have their own memory, files, and flow control. These motivations generate a need for orderly, multi-process distributed object operating environments. Ideally there should be a mechanism by which programmers can determine the process within which their specific object will reside.

As is well known those skilled in the art, objects must be activated within their host process prior to serving clients. In addition, a first server object responding to the call of a first client will often in turn call a second server object which may in turn call a third server object (and so on). Thus multiple objects may be activated in response to a single call. If it is known a priori that this is the case, a mechanism which enabled multiple object activations in response to a single call may decrease the overhead associated with multiple single instance object activations. However, in current distributed object frameworks, there is no such mechanism.

While some of the abovementioned inefficiency could be eliminated within existing frameworks, the optimization of resources within current distributed systems often comes only at the expense of great programming effort. This is, in effect, antithetical to other goals of distributed object systems. Efforts to further extend the advantages of object oriented programming techniques must be directed towards improving efficiency in the utilization of all resources, including memory, processing power, and network bandwidth. What is needed is a straight forward framework in which the potential for overlap, redundancy, and unnecessary overhead within distributed objects can be easily eliminated. This will require a distributed object having a structure which will allow for a different, more efficient utilization of resources, including the capability to associate collections of objects based upon the resources which these objects share. Moreover, effective methods for managing these collections of objects will be required.

SUMMARY OF THE INVENTION

To achieve the foregoing and other objectives and in accordance with the purpose of the present invention, methods, apparatus and data structures for managing collections of objects are described. In one aspect of the invention, an object that is intended for use in a distributed object operating environment has a structure including a group designation, a coactivation designation and a co-process designation. The group designation is arranged to identify a group to which the object belongs. The group is defined as a collection of objects which share a common persistent state. The co-activation designation is arranged to identify a co-activation set to which the object belongs. The co-activation set is a collection of objects which are to be activated at the same time. The co-process designation is arranged to identify a co-process set to which the object belongs. The co-process set is a collection of objects which are to be activated within a single process. Various embodiments and a variety of methods of utilizing one or more of these designations to facilitate efficient operation of a distributed computing system are also described.

In some applications, a particular object may be conceptually divided into a plurality of sub-objects, with each sub-object having its own portion of persistent memory. In this embodiment, the particular object may only be invoked as a whole, but the object is provided with a mechanism for accessing the selected sub-object in response to a call from a client that invokes the object and identifies the sub-object in a sub-object field of an object reference that refers to the object.

In a separate aspect of the invention, objects termed object references may be provided that are arranged to permit the identification of the location of an associated object. In this aspect, the object reference includes a host identifier indicative of the host computer system on which the associated object is stored. The object reference also includes an object identifier that may be used by the host computer system to locate the object thereon. Additionally, the object reference includes a sub-object field that may be used to identify sub-objects within the associated object. In one preferred embodiment, the sub-object field is in the range of 1–32 bytes. In one specific embodiment, the sub-object field is 16 bytes.

In other aspects of the invention various methods of managing collections of objects during the invocation of a particular server object (also called a target object) in a computing system that utilizes a distributed object operating environment having an object request broker are described. In one method aspect, when a client seeks to invoke a target object located on a separate computer, a determination is made as to whether a connection already exists between a client and the server. If there is not an existing connection, a determination made as to whether the co-process to which the target object belongs is active. If so, the server's active co-process is identified as the proper location to establish a connection. If not, the server's co-process is activated and reported as the proper location to establish a connection.

In another method aspect a determination is made as to whether the target object is part of a group that shares a persistent state. If such a group exists and is inactive a group activation function for the target object's group is called. In one embodiment a check is made to determine whether the target object's group has been registered. If it has not been registered it is assumed that the target object is not part of a group and that there is no need to call the group activation function. If the target object is part of a group, then a check is made to determine whether the target object's group is in a group registration table. If so, the object is already active, if not the group may be activated. The checking steps may be reversed or combined in alternative embodiments.

In yet another method aspect, a determination is made as to whether the target object is part of a co-activation set of objects that are to be activated at the same time. If the target object is part of such a co-activation set and the co-activation set is inactive, then all of the objects in the co-activation set are activated together. In one embodiment, a check is made to determine whether the target object's co-activation set is identified in a co-activation table. If so, it is determined that the target object is already active and that there is no need to reactivate the target object or any of the other objects in the target object's co-activation set. If not, the objects in the co-activation set are all activated at the same time.

BRIEF DESCRIPTION OF THE DRAWINGS

The invention, together with further purposes and advantages thereof, may best be understood by reference to the following description taken in conjunction with the accompanying drawings in which.

DESCRIPTION OF THE INVENTION

Figure 1:
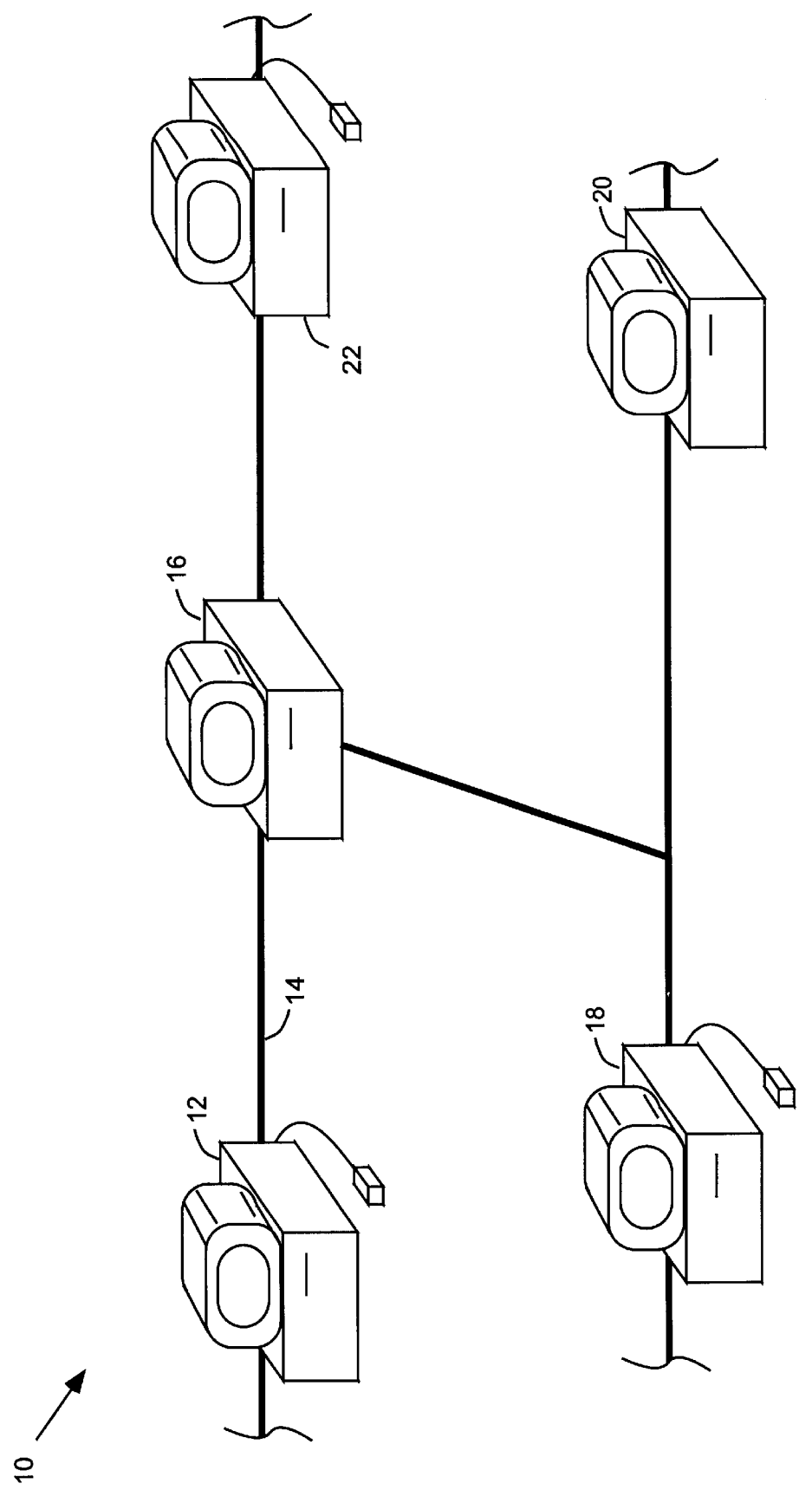
FIG. 1 is a pictorial illustration of various computers linked together in a computer network.

The present invention relates to a distributed operating environment based on object oriented programming (OOP). More specifically, this invention discloses methods, apparatus and data structure for managing collections of objects in a distributed environment. As described in more detail below, the various collections of objects may include groups, co-activation sets, co-process sets, and sub-objects. As used herein, the term "group" refers to a collection of objects that share a persistent state. The term "co-activation set" refers to a collection of objects that are to be activated at the same time. The term "co-process set" refers to a collection of objects that are intended to be executed in a single process. That is, if these objects are running, they will all run within a single process. This is particularly applicable in computing systems that are capable of simultaneously running multiple processes such as are available with certain UNIX based and other operating systems. In the following discussion, the different collections of objects will be described in more detail, first through discussing the motivation behind collections of objects, and then further through the detailed description of the method aspects of the present invention.

I. DEFINITION OF TERMS

As used herein, the term "distributed object" or "object" refers to an encapsulated package of code and data that can be manipulated by operations through a defined interface that is associated with an object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is IDL. Second, distributed objects are location-independent, i.e., distributed objects can be located anywhere in a network. This contrasts sharply with traditional programming objects which typically exist in a single address space: the address space of the "client." Distributed objects can be object clients or object servers, depending upon whether they are sending requests to other objects or replying to requests from other objects. Requests and replies are made through an Object Request Broker (ORB) that is aware of the locations and status of the objects.

A "distributed object system" or "distributed object operating environment" refers to a system comprising distributed objects that communicate through an ORB.

An "object reference" or "objref" is an object that contains a pointer to another object. Additionally, an objref can include a portion of memory (the "sub-object identifier") which can be used for identifying a sub-object. With the exception of the sub-object identifier, the creation and definition of object references will be familiar to those skilled in the art.

A "client" as defined herein refers to an entity that sends a request to second object. In this model, the second object is referred to as a "server object" or a "target object". Thus, clients invoke operations, or implementations, from servers. In a distributed object operating environment, clients need not have knowledge of the implementation programming language, nor does the implementation have to have knowledge of the client's programming language due to the requirement of multilingual character of such objects. Clients and servers in distributed object operating environments need only communicate in terms of the interface definition language. As noted above, the request by the client to the server, and the server's reply to the client, is handled by the ORB. It should be pointed out that the client and server can exist within the same process, on the same host computer, or on two different host computers.

An "object interface" is a specification of the operations, attributes, and exceptions that an object provides. Preferably, object interfaces for distributed objects are written using IDL. As noted above, objects perform transactions through their interfaces. The use of interfaces therefore relieves the need of objects to be aware of the programming languages used to define the methods and data of the objects in the transaction.

To "marshal" a packet of information is to prepare this information for transfer via shared memory or over a network communications line. This often means organizing the data in a particular format in accordance with the network communications protocol being used.

To "unmarshal" a packet of information is to essentially reverse the marshaling procedure and produce data in a format which is meaningful in a non-network environment.

II Managing Collections of Object

In a distributed object operating environment, requests and replies are made through an Object Request Broker (ORB) that is aware of the locations and status of the objects. One architecture which is suitable for implementing such an ORB is provided by the common object request broker architecture (CORBA) specification. The CORBA specification was developed by the object management group (OMG) to define the distributed computing environment world in terms of objects in a distributed client-server environment, where target objects are capable of providing services to clients requesting the service. In the following discussion, the terms "object" and "distributed object" will be used interchangeably, as the following invention is directed to both types.

In a preferred embodiment of the present invention, distributed objects are located on one or more computers linked together by a network. The network may take any suitable form. By way of example a representative network arrangement 10 is illustrated in FIG. 1. The network arrangement 10 includes a first computer 12 which is coupled to a transmission line 14. The network 10 further includes a server, router or the like 16 in addition to other computers 18, 20, and 22 such that data and instructions can be passed among the networked computers. The design, construction and implementation of computer networks will be familiar to those of skill in the art.

Figure 2:
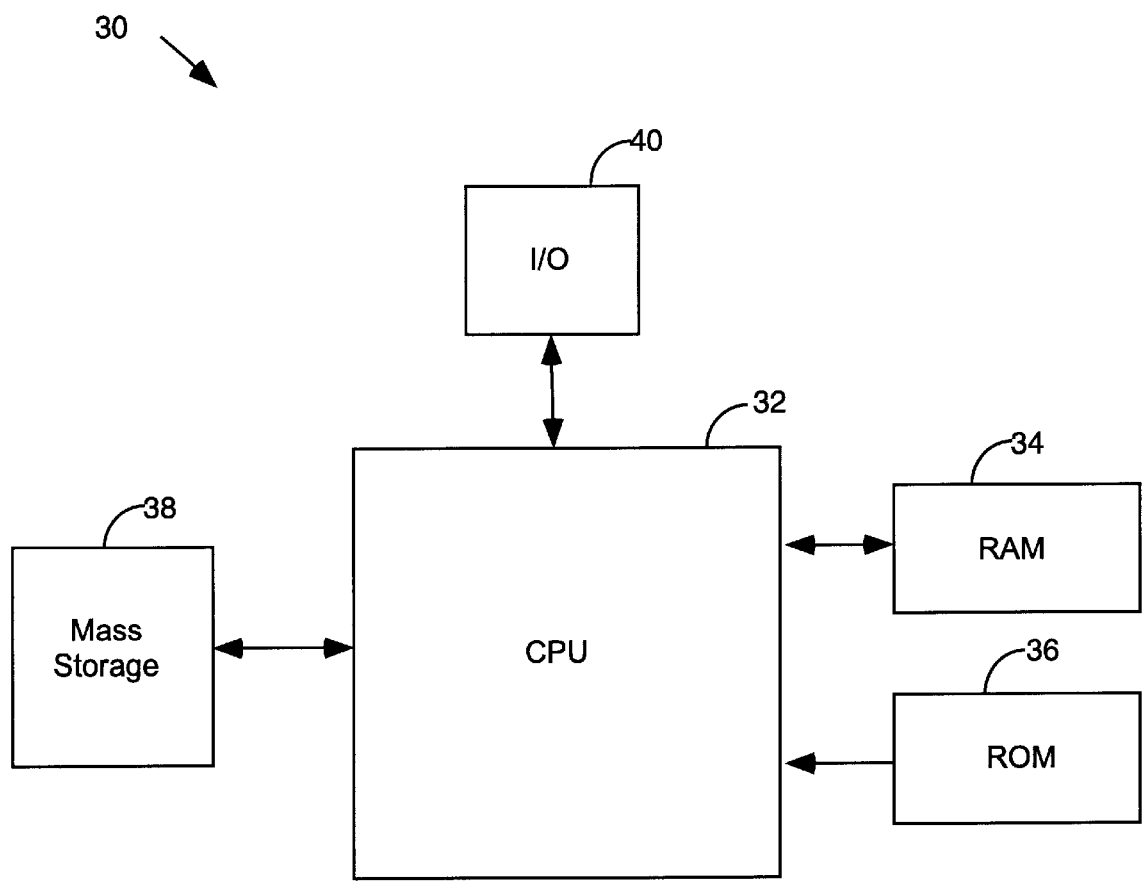
FIG. 2 illustrates diagrammatically some of the major components of one of the computers illustrated in FIG. 1.

A representative computer 30 suitable for use as computers 12, 18, 20, and 22 of FIG. 1 is illustrated schematically in FIG. 2. Computer 30 includes a central processing unit (CPU) 32 which is coupled bidirectionally with random access memory (RAM) 34 and unidirectionally with read only memory (ROM) 36. Typically, RAM 34 is used as a "scratch pad" memory and includes programming instructions and data, including distributed objects and their associated data and instructions, for processes currently operating on CPU 32. ROM 36 typically includes basic operating instructions, data and objects used by the computer to perform its functions. In addition, a mass storage device 38, such as a hard disk, CD ROM, magneto-optical (floptical) drive, tape drive or the like, is coupled bidirectionally with CPU 32. Mass storage device 38 generally includes additional programming instructions, data and objects that typically are not in active use by the CPU, although the address space may be accessed by the CPU, e.g., for virtual memory or the like. Each of the above described computers further includes an input/output source that typically includes input media such as a keyboard, pointer devices (e.g., a mouse or stylus) and/or network connections. Additional mass storage devices (not shown) may also be connected to CPU 32 through a network connection. It will be appreciated by those skilled in the art that the above described hardware and software elements, as well as networking devices are of standard design and construction, and will be well familiar to those skilled in the art.

One of the underpinnings of a distributed object operating environment is the interaction between the client, which is defined herein as an entity requesting a service, and a target object providing the service. While this client-target interaction is new to the object oriented paradigm, of which the distributed object operating environment is a recent extension to, it is often discussed in terms of a client-server model, a phrase inherited from prior art networking terminology. By way of example, the client may be computer 12 which requests services from an object existing on computer 18. This is very similar to a classic networking description of the client-server model. However, while there is a legitimate analogy between the distributed object operating environment client-server model and prior networking concepts, they are not equivalents, as those of skill in the art will appreciate.

As will also be appreciated by those of skill in the art, the aforementioned entities which can be a client include, but are not limited to, a process running on a host computer, hereinafter referred to as a client process and client host computer respectively, and an object, hereinafter referred to as a client object. For the sake of clarity, the object providing the service is hereinafter referred to a target object or a server object. Thus in the following description, when a client invokes a target object, the client may be any entity such as a client process or a client object.

Elaborating further on the abstract client-server interaction, a client will "call" a target object to "invoke" a "method" that is defined on the target object. Note that while "call" and "invoke" can carry slightly different meanings, herein the two terms are used interchangeably and their meanings will be understood from the context of the discussion herein (as is also done by those skilled in the art). As is well known to those of skill in the art, a method is a procedure contained within a target object which is made available to other entities, i.e. clients, for the purpose of requesting services of that object. Thus the object performing the service for the client is the server, hence the term client-server. In addition to calling with a method, the client may also pass along any arguments, also referred to as parameters, necessary for the target object to perform the requested method. Please note that the previous term "method" is a term of the art of object oriented programming and differs from the term "method" classically used in drafting patent applications. In the following discussion, the Applicant believes that it is made clear (either by context or by a hint from the Applicant) which meaning for the term "method" is intended.

As can be seen, conceptually the process of a client requesting services of a target object is relatively easy to understand. Yet in actual practice, implementing these interactions is tricky, with a plethora of hurdles to effective operation presenting themselves almost immediately. Further problems arise when a true ORB must be implemented. The following discussion will emphasize a client-server model wherein the client requesting services of the target object is a client object which calls an object on a remote server host computer. As will be appreciated by those of skill in the art, this is a more complicated client-server scenario and thus encompasses the critical steps which may be required in a variety of client-server models. Therefore, it will be clear to those of skill in the art how to implement the following methods, apparatus, and structures in a variety of client-server models.

Figure 3:
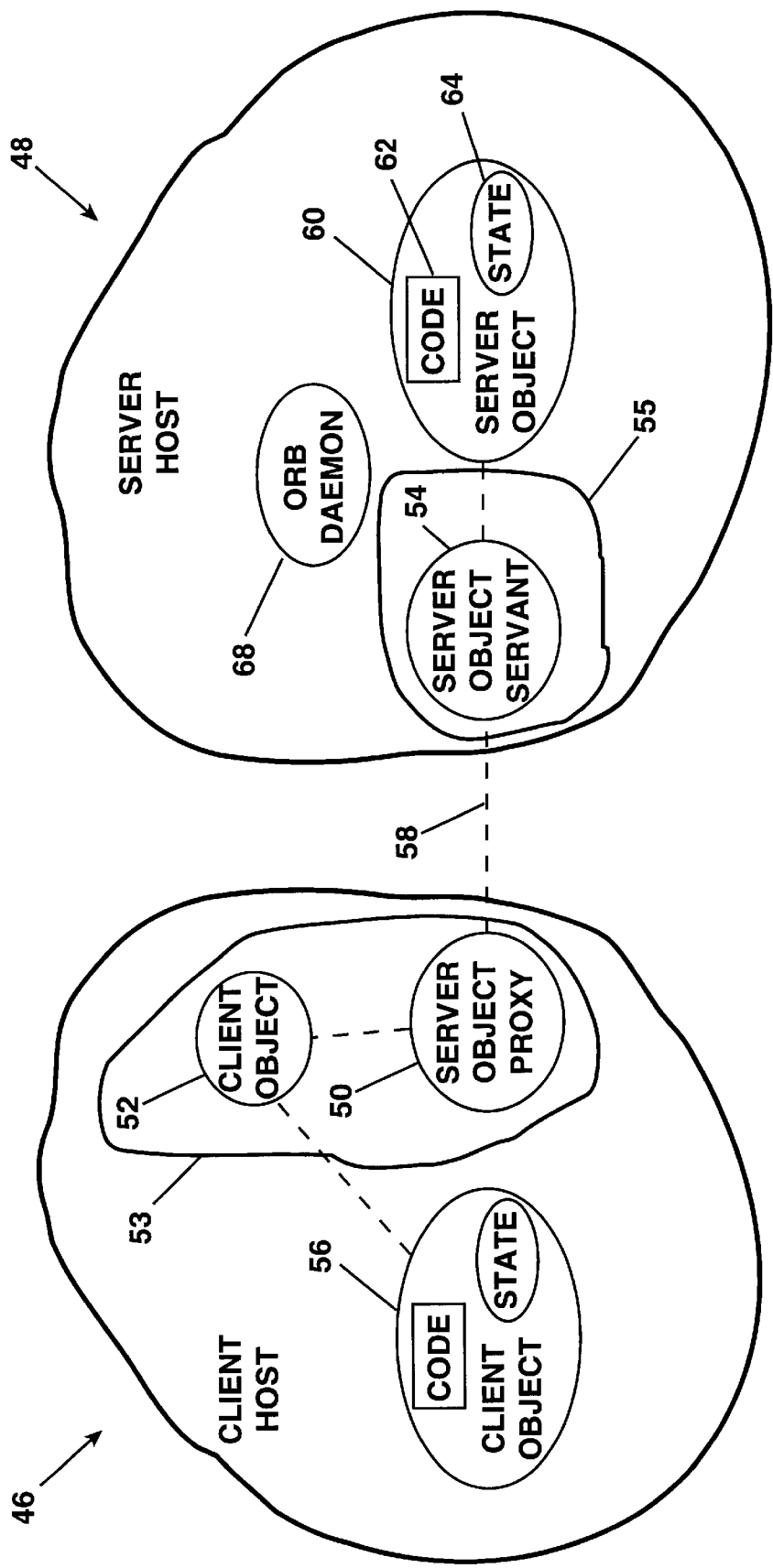
FIG. 3 is a pictorial illustration of one client-server model showing a relationship between a client object, a server object proxy, a server object servant, and a server object in a distributed object operating environment.

Referring next to FIG. 3 one embodiment of a client-server model that is typical of a distributed object operating environment will be described. As shown, the distributed operating environment includes at least two computer systems which are referred to as the client host 46 and the server host 48. In this embodiment, server objects which are located on the server host 48 can be utilized transparently by client objects located on the client host 46. That is, as is discussed below, a client process which is running the client object works with the ORB to enable the client object to utilize target objects regardless of their location, i.e. remote or local. Each of these object types correspond to the distributed object described in the background and in the definition section.

In FIG. 3, a server object proxy 50 and a client object 52 exist in a client process 53 which is running on the client host 46. The server object proxy 50 corresponds to a server object 60 existing on the server host 48. That is, the server object proxy 50 is a surrogate for the server object 60, a surrogate simply being an object which locally represents a remote object. The server object servant 54 exists in a server process 55 running on the server host 48 and is essentially the implememation (running under the server process 55) of the server object 60. The example of FIG. 3 shows an object 60 which is a software object 60 that includes code 62 and a state 64 and is also located on the server host 48. Similar to the server object servant 54, the client object 52 can also be a software object 56 including code and state. However, as will be appreciated by those skilled in the art, objects come in many varieties, all of which fall within the scope of the present invention. The hashed line 58 illustrates the connection between the software client object 56, the client object 52, the server object proxy 50, the server object servant 54, and the software server object 60. As will be appreciated, the hashed line 58 does not represent any limitation, explicit or implied, on how these entities may interact. Rather it simply shows one potential conduit for the flow of communication.

Additionally, FIG. 3 shows a process running on the server host 48 known as the ORB daemon 68. The ORB daemon 68 is responsible for a variety of pertinent tasks. These pertinent tasks include establishing connections between the server object proxy and the server object servant 54 and creating processes such as starting the server object servant 54 in response to an initial invocation of the server object 60. The term "daemon" is well known to those skilled in the art. As will be appreciated by those of skill in the art, the component of the ORB daemon 68 which performs the aforementioned tasks is an element of one implementation of the CORBA Object Adapter (OA). The Object Adapter provides server hosts with an interface to other components of the ORB. Thus any object adapter can be designed to perform the functions of the ORB daemon 68.

To briefly summarize one aspect of the present invention which relates directly to the aforementioned client-server interaction, when the client object 52 invokes the server object 60, the client process 53 responds by calling the server object proxy 50. The server object proxy, in conjunction with the server object servant 54 and the ORB daemon 68, manages the invocation so that applications running on the client host 46 can transparently utilize object such as object 60 located on the server host 48.

From the viewpoint of an omniscient observer, any client running on the client host 46 uses a programming language object, or other type of object, as a surrogate or proxy for the actual server object 60. However, from the viewpoint of a client running on the client host 46, the server object 60 is called in the exact same manner as if the object servant 54 were locally available. As will be appreciated by those of skill in the art, the following methods and apparatus work equally well when the client and the server are located within the same process, located on the same host computer, or located on two different host computers. However, as the latter scenario is the most complicated and encompasses typical steps necessary for the first two scenarios, only the scenario in which the client and server processes are located on two different host computers is described in detail. Nevertheless, from the following description it will be apparent to those of skill in the art how to implement this method in all three scenarios.

Figure 4:
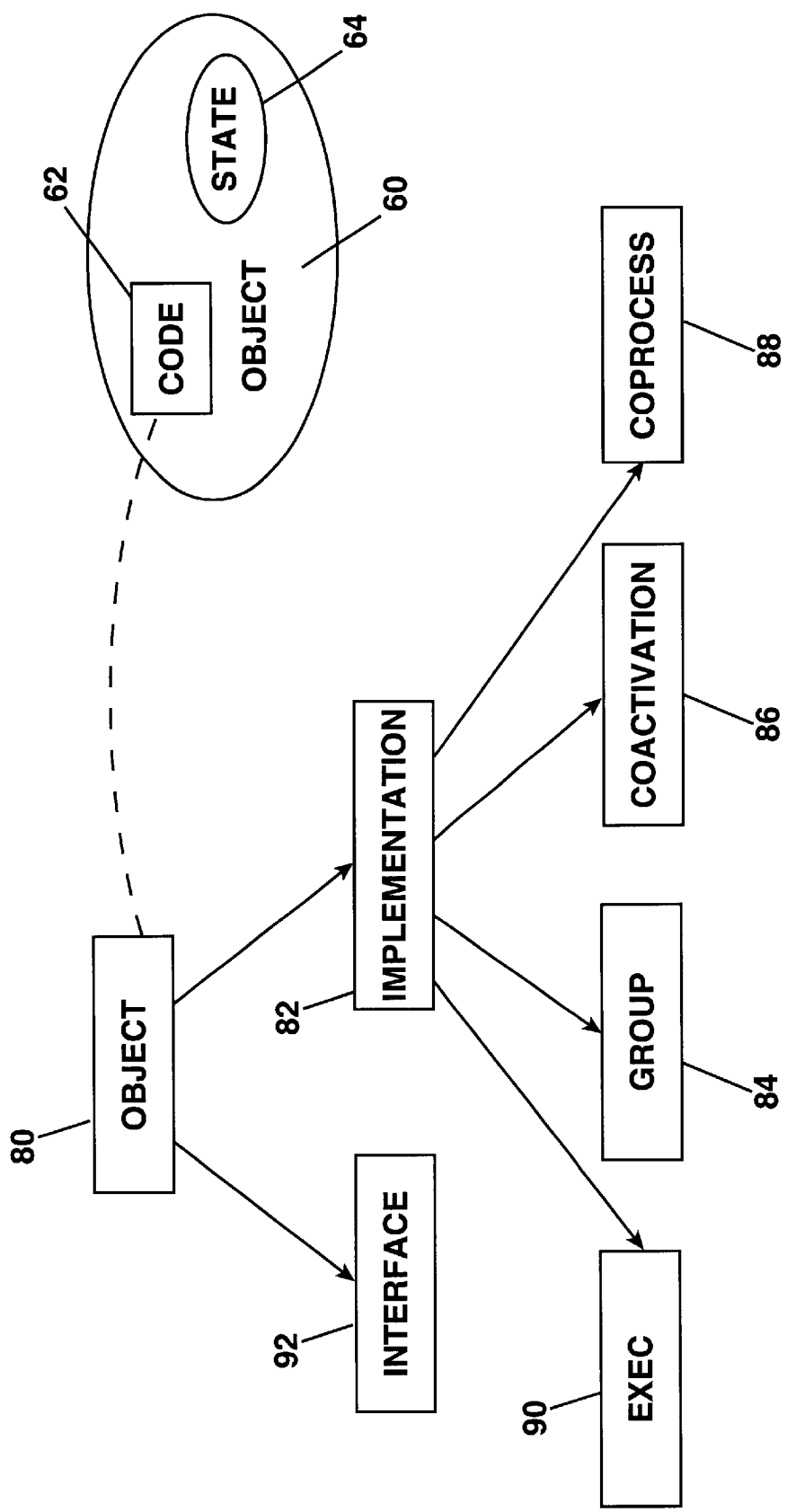
FIG. 4 is a pictorial illustration of a distributed object illustrating the types of collections that the object may be associated with in accordance with one embodiment of the present invention, the collections include a group, a co-activation set, and a co-process set.

Referring next to FIG. 4, an object 80 which includes a specific implementation 82 which points to a group 84, a co-activation 86, a co-process 88, and an executive definition (hereinafter referred to as an exec.def) 90 which correspond to the object 80, and an interface 92. The exec.def 90 defines how to start server processes and in one embodiment is simply an executable path and argument parameters. In another embodiment, the group 84, the co-activation 86, and co-process 88 are eliminated and the exec.def 90 can include all the information previously stored in these elements. As will be appreciated by those skilled in the art, the interface 92 allows the object 80 to receive and transmit messages in an orderly manner which protects the contents of the object 80. Similar to the objects 52 and 60 in FIG. 3, the object 80 can be a software object having corresponding code 62 and a state 64.

In the following, motivation for the group 84, the co-activation 86, and the co-process 88 will be discussed. First, consider a situation wherein different objects 80 share an equivalent or interrelated persistent state. This is the case when two or more different objects 80 contain similar, permanently stored data. By way of example, this situation arises when two text documents (which are considered objects) contain similar information such as similar paragraphs, header text, or graphics. As will be appreciated by those of skill in the art, if the persistent state which is shared by these objects were stored in only one location, and was in turn only opened once, only closed once, etc., resources would be more efficiently utilized. According to one aspect of the present invention, a collection of objects which share a persistent state are defined as belonging to the same group 84.

As is well known to those of skill in the art, in simple terms, a process is an entity which is executed by a computer system. For example, a process will typically have a portion of the computer systems memory allocated to it, and will have one or more thread of execution. In the OOP world, an object 80 is implemented by a single process. According to one aspect of the present invention, multiple objects can be implemented by a single process, but in most systems, it is important that an object 80 is active in only one process at a time. Objects which have an identical "co-process" 88 are objects which are intended to be constrained to always sharing the same process whenever both objects are active. This scheme allows objects in the same co-process to synchronize through memory. Furthermore, co-processes eliminate the need for an unnecessarily large multiplicity of processes since more than one object can exist in a single process.

Whenever an object 80 is invoked for the first time, regardless of where the object exists or what entity invokes it, the process in which the object is executed must allocate resources to this object 80. Activation of an object 80 is defined to include this step of allocating resources. There may arise instances when, for reasons such as efficiency or organizational purposes, it may make sense for different objects 80 to be simultaneously activated. Take for example, a collection of objects which each, as part of their individual activation, open, read and then close an identical file stored on a hard disk drive. As is well known to those of skill in the art, the sequence of opening, reading, and then closing a file on a hard disk drive can be a relatively lengthy process. Perhaps a better utilization of resources would involve simultaneously activating each of these objects 80, thereby enabling a single open, read, and close sequence for the collection of objects. In the more general case, an object must perform a plurality of actions upon activation, these actions all summed up in the objects "activation function." If a collection of objects were associated such that activation of one object 80 resulted in simultaneous activation of each of the objects 80, the apparent benefits could be achieved. As defined by the present invention, a collection of objects which are simultaneously activated share the same "co-activation" 86.

Figure 5:
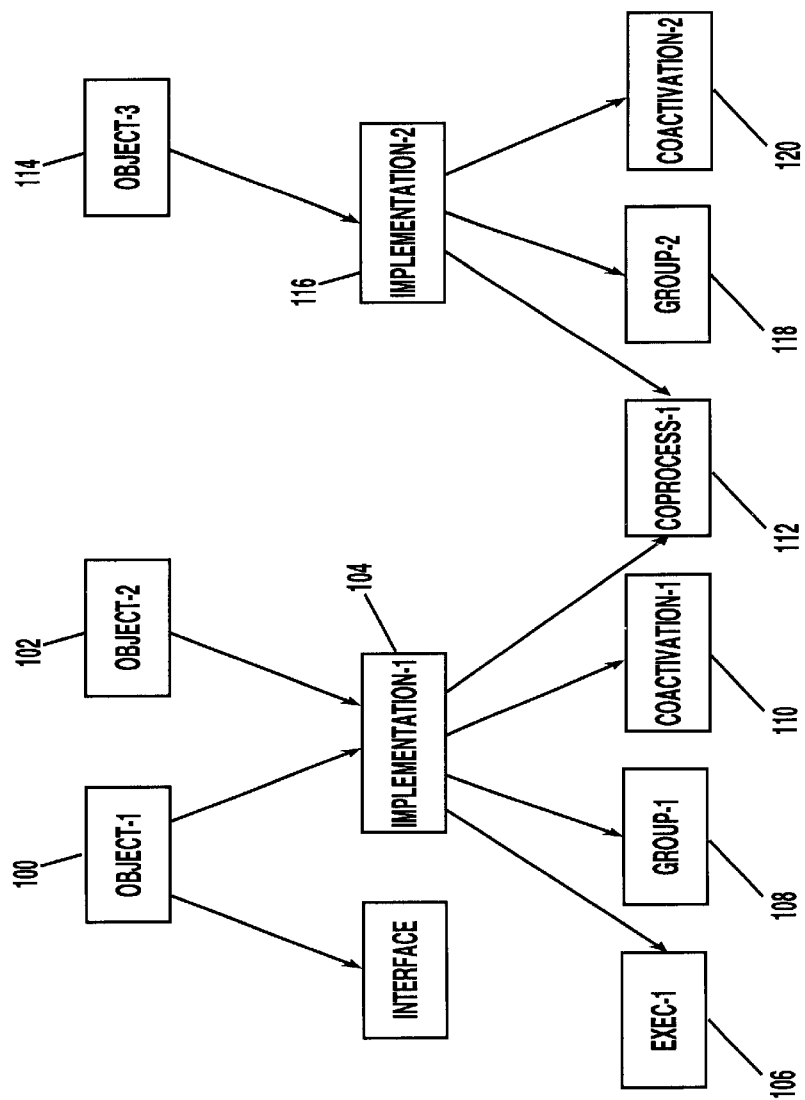
FIG. 5 is a pictorial illustration of a couple of association frameworks under which different objects may share groups, co-activations, and/or co-processes in accordance with one aspect of the present invention.

FIG. 5 illustrates an explicit example of how different objects can be interlinked by the collections of objects described above. A first object 100 and a second object 102 both share the same implementation 104 (i.e. implementation-1). That is, they are implemented by the same code. Accordingly, since the first and second objects have the same implementation, they would also share the same exec 106 (exec-1), group-1 108, co-activation-1 110, and co-process-1 112. In contrast, a third object 114 points to implementation-2 116 which corresponds to co-process-1 112, group-2 118, and co-activation-2 120. Thus object-1, object-2 102, and object-3 114 all share co-process-1 112. In the general case, every object which eventually points to a group, a co-activation, or a co-process shares the same group, co-activation, or co-process, respectively.

As will be appreciated by those of skill in the art, the distributed framework which has been disclosed above provides the OOP programmer with improved tools for writing OOP software which can effectively take advantage of the resources available in a distributed programming environment.

Figure 6:
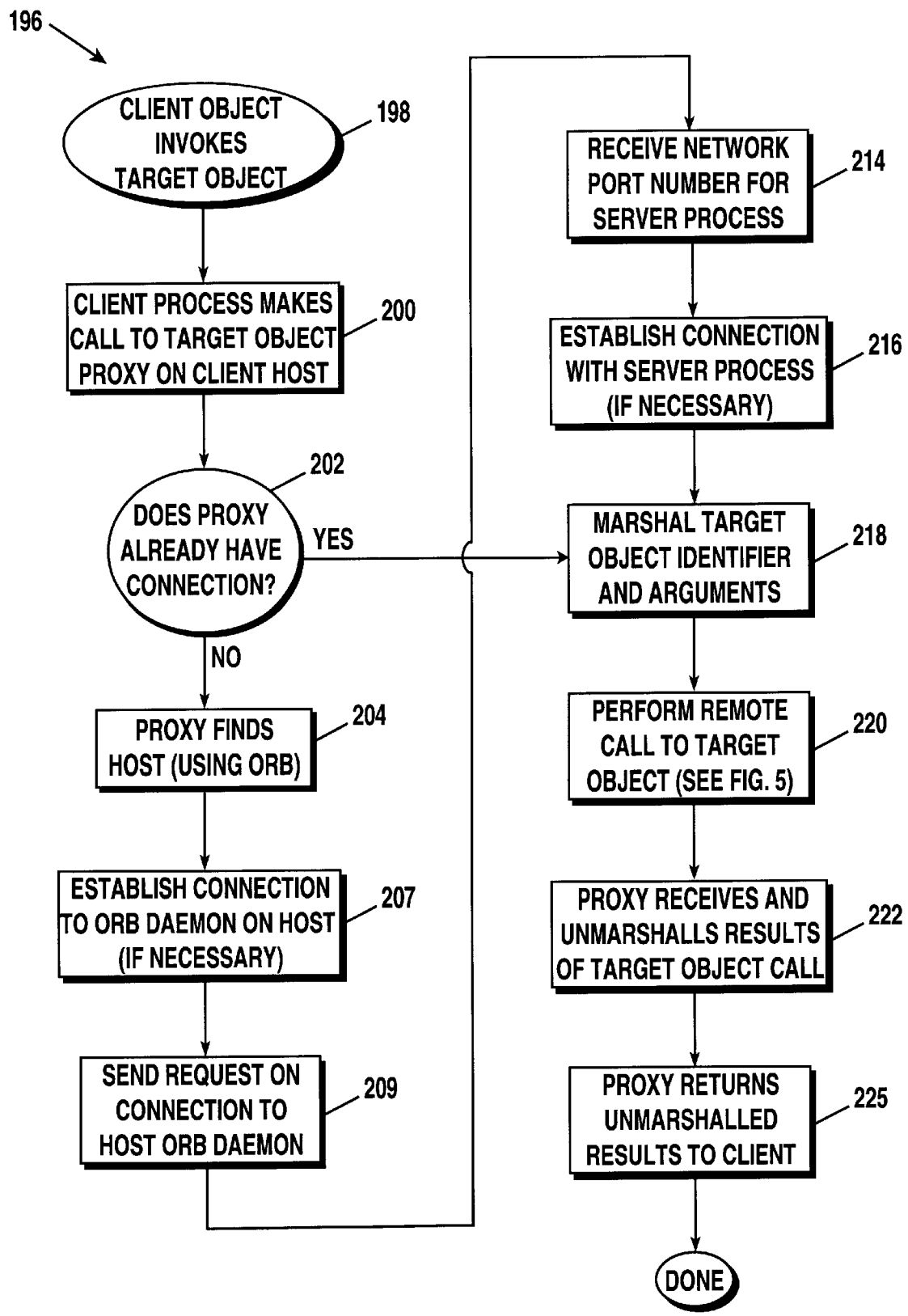
FIG. 6 is a flow chart illustrating a method used by a client object to invoke a distributed server object in accordance with a one aspect of the present invention.

Referring next to FIG. 6, a method 196 of invoking a target object in accordance with one embodiment of the present invention will be described. The server object invocation method begins in a step 198 when a client object 52 running in a client process 53 on the client host 46 initiates the invocation of a server object 60. Typically, the client object will only have a pointer to the server object (i.e. an object reference) and will know the server object's interface requirements (or at least the portion of the interface requirements that apply to the information it is seeking). Therefore, the invocation begins when the client object calls the server object with a call that identifies the server object using the object reference and provides the arguments necessary to meet the server object's interface requirements. As illustrated in step 200, the client process 53 responds to the client object's call with a call to the server object's proxy 50 which is located on the client host 46. Suitable methods for creating the server object proxy and/or establishing a connection between the client object and the server object proxy on the same machine and within the same process are known to those skilled in the art.

Once the call is received by the server object proxy 50, the proxy determines whether it already has an established connection with a server object servant 54 existing on the server host 48. If the proxy 50 has an established connection, then process control goes directly to a step 218 where it marshals the target object identifier and call arguments, thereby preparing the call for transmission over the network. On the other hand, if the proxy 50 does not have an established connection with server object servant 54, then a connection must be established. In the latter case, the server object proxy 50 proceeds to step 204 where it locates the server host. It should be appreciated that the server host will be identified in the object reference. Therefore, the server object proxy contacts the ORB which will provide it with the network port number of the ORB daemon 68 server host 48.

Next, in a step 207, the server object proxy 50 establishes a network connection with the ORB daemon 68 on the server host. However, if the proxy 50 already has an established connection with the ORB daemon 68, it may not be necessary to establish a second connection. In any event, once the connection is established, the server object proxy 50 requests, in a step 209, that the ORB daemon 68 return the network port number of the server process 55 on which the server object servant 54 is running. Of course, although steps 207 and 209 are logically explained as separate steps, they can be accomplished simultaneously in a single call. Methods of establishing connections between processes are well known in the art. One suitable method of establishing the aforementioned process is described in Brownell et. al.'s copending U.S. patent application Ser. No. 08/608,316 entitled: "METHOD AND APPARATUS FOR MANAGING CONNECTIONS FOR COMMUNICATION AMONG OBJECTS IN A DISTRIBUTED OBJECT SYSTEM" which is incorporated herein by reference in its entirety.

A suitable process that the server host's ORB daemon may go through in order to find and return the appropriate port number will be described below with reference to FIG. 7. However, from the standpoint of the server object proxy 50, it simply receives the appropriate server process port number in a step 214. With this knowledge in hand, the proxy can establish a connection with the appropriate server process in step 216. Of course, the client process may have previously established a connection with the server process for any variety of reasons such as a previous call to another target object running in this same server process. In this case, it may not be necessary (or desirable) to establish a second connection with the server process.

Once the connection is established in step 216, the server object proxy 50 will marshal the target object identifier and the arguments for the call in step 218. The nature of the marshaling will depend entirely on the nature of the protocols used for communications on the particular network that is in operation and its implementation should be apparent to those of skill in the art. Then, in a step 220, the server object proxy 50 performs a remote call to the target object 60 over the connection established in step 216. As a result of this call, in a step 222, the server object proxy 50 receives and unmarshals the result of the target object call of step 216. Once the results have been unmarshaled, the server object proxy 50 returns the unmarshaled results to the client in a final step 225. The invocation is then complete and the client can use the results in any appropriate manner.

Figure 7:
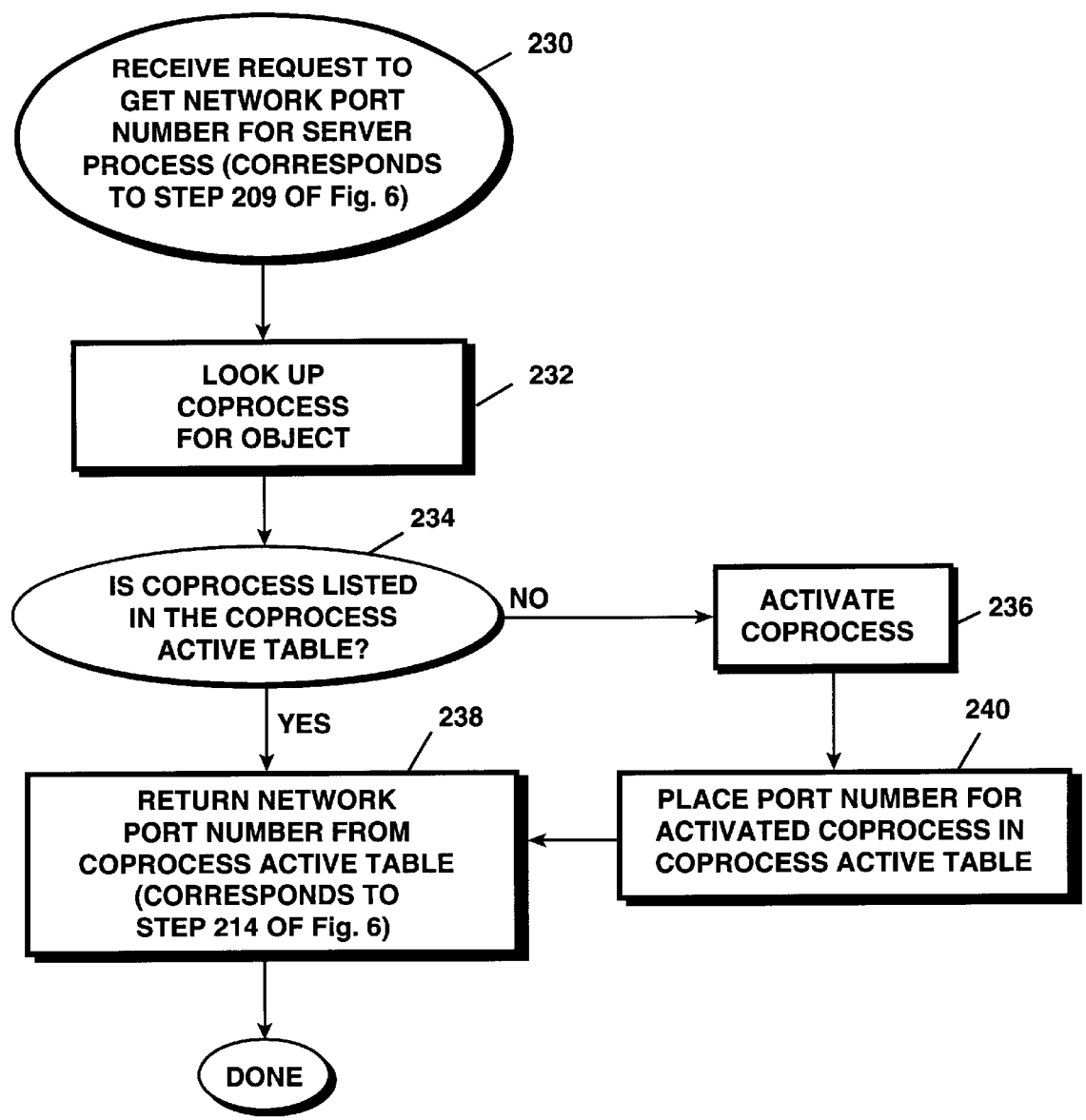
FIG. 7 is a flow chart illustrating a method carried out by a server object's host ORB daemon in response to a client request for the server object's process' network port number.

Referring next to FIG. 7, a method that the ORB daemon 68 may use to handle the client's request for the target object's network port number will be described in more detail. The embodiment of FIG. 7 begins in a step 230 when the ORB daemon 68 receives a request to get the network port number for the server process 55. Upon receiving the request, the ORB daemon 68 looks up the co-process for the target object in a step 232. As discussed previously, the ORB daemon 68 is a component of the object adapter. The object adapter also includes an object adapter data base, which can be accessed by the ORB daemon 68. In one embodiment, information regarding objects, such as the co-process and status of each object, is stored within the object adapter data base. Thus the ORB daemon 68 can look up co-process information in the object adapter database. Of course other embodiments may be suitable depending upon the implementation. For example, the ORB daemon can maintain its own object data base, perhaps caching information in transient memory for speedy access and deletions. In a next step 234, the ORB daemon 68 determines if the co-process is listed in a co-process active table which is arranged to list all of the processes that are currently active within the daemon's host machine. In a preferred embodiment, the active process table is stored in transient memory on the server host. If the co-process is not listed in the active process table, it is understood that the co-process is not currently active. When this occurs, the co-process is activated in step 236. During the activation of the co-process, the appropriate network port number for the activated co-process is stored in the co-process active table in a row associated with the co-process. After the co-process has been activated, control is passed to step 238 where the appropriate network port number is returned to the client machine. More specifically, the network port number for the target object's server process that is listed in the active process table is returned to the server object proxy 50 and the ORB daemon's role is complete. Details of a method suitable for activating a server process as well as the structure and functions of a representative active server table are described in detail in Vanderbilt et al's copending application Ser. No. 08/408,645entitled: "METHODS AND APPARATUS FOR PROCESS STARTUP" which is incorporated herein by reference in its entirety.

Figure 8:
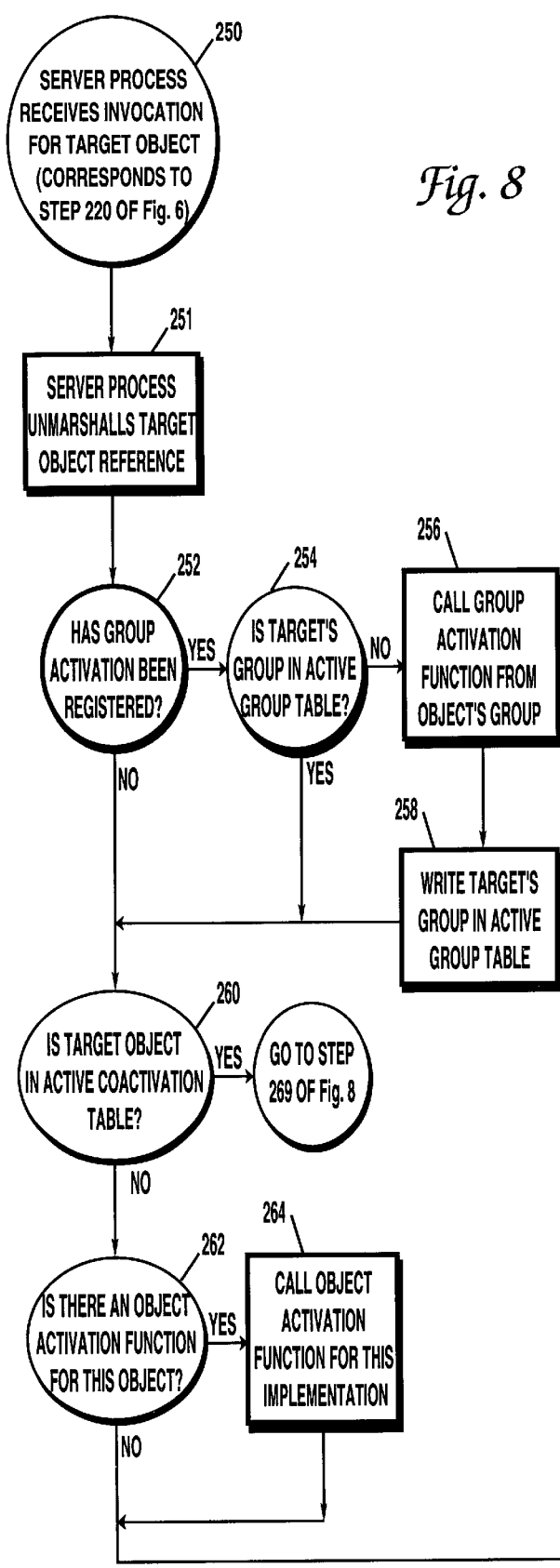
FIG. 8 is a flow chart illustrating a method carried out by the servant's process in response to an invocation of the server object.
Figure 8:
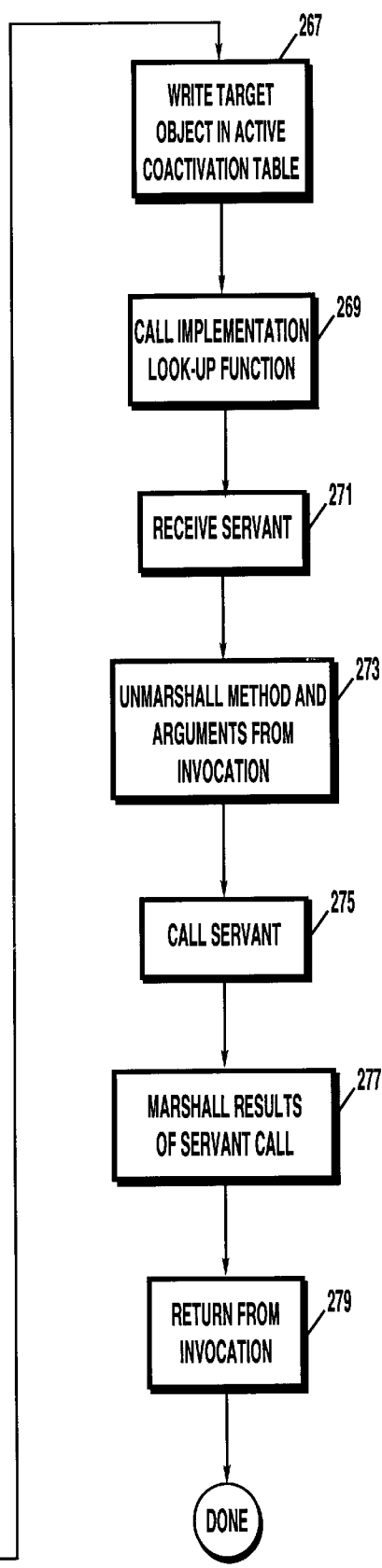

Referring next to FIG. 8, one suitable response of the target object servant 54 to the remote object call of step 220 in FIG. 6 will be described in more detail. As described above, the proxy first locates the target object's server process and establishes a connection therewith. After a connection has been made, the proxy performs a remote call to the object (see description of step 220 of FIG. 6). The following description describes a method by which the call can be handled by the server process. This method begins in a step 250 when the server process 55 receives an invocation for the target object 60. Note that step 250 is the server host step corresponding to the client host step 220 of FIG. 6. As discussed previously, the server host 48 receives the invocation message over the network via a process network port number. Initially, the server process unmarshals the target object reference. As is well known to those skilled in the art, the "unmarshal" step 251 is essentially the inverse of the "marshal" step 218 of FIG. 6. That is, the information is translated from a network protocol format into a format useful within the server process 55. Note that the structure of the object reference will be discussed in more detail later with respect to FIG. 9. Next, in a step 252, the server process 55 determines if group activation has been registered. That is, does the target object 60 share a group and therefore have a group activation function. As discussed previously, objects which share a group share some persistent memory, so at this point steps are taken to enable sharing of the group persistent memory. If step 252 determines that group activation has been registered, process control is given to a step 254 where the process of managing group activation begins. On the other hand, if in step 252 it is determined that group activation is not registered, process control goes directly to a step 260, bypassing the group activation steps as no group activation function exists.

Group activation management begins in step 254, where the server process 55 determines if the target object's group is listed in an active group table. The active group table can be located in memory anywhere in on the server host, yet certain locations will provide greater operating efficiency. For example, storing the active group table in transient memory allocated to the server process is a suitable method. The group activation function is defined by the author of the object, and, as will be apparent to those of skill in the art, may vary depending upon the application. If in step 254 it is determined that the target object's group is already listed in the active group table, then the group is already active. Therefore, the group activation function does not need to be repeated and process control is passed directly to step 260. However, if the target object's group is not listed in the active group table, then control is passed to a step 256 where the group activation function is performed. Subsequent to step 256, in a step 258, the process writes the target object's group in the active group table and process control is passed to step 260. Thus step 258 updates the active group table thereby perpetuating the effectiveness of this process.

Object co-activation management begins in step 260 of FIG. 8, where it is determined if the target object 60 is in the active co-activation table. The active co-activation table can be located in memory anywhere on the server host but again, certain locations will provide greater operating efficiency. For example, storing the active co-activation table in transient memory allocated to the server process 55 has been found to work well. If the target object 60 is in the active co-activation table, then the target object is already active in the process and its activation is not required. When this occurs, the method proceeds directly to a step 269 bypassing the co-activation steps. However, if in step 260 it is determined that the target object 60 is not in the active co-activation table, co-activation is required and the control is passed to a step 262 where it is determined if there is an object activation function for the target object. If so, a step 264 calls the object activation function for this implementation and passes control to a step 267. Otherwise, in the case that no activation function exists for the target object, control proceeds directly from step 262 to step 267. As will be appreciated by those of skill in the art, the aforementioned object activation function may be unique to each object and will vary depending upon the nature of the object. Thus, bypassing step 264 of FIG. 8 does not preclude an object from performing it's own activation function at a later time. In either event, the server process writes the target object's co-activation into the active co-activation table in step 267. Thus step 267 updates the active co-activation table thereby perpetuating the effectiveness of this method.

Once step 267 has been performed, the embodiment described in relation to FIG. 8 has completed all steps related to co-process, group, and co-activation. Next, in steps 269–279, the additional steps that must be performed in order to complete the server's response will be described. It should be appreciated that these steps may be varied somewhat based on the implementation and will be familiar to those skilled in the art. Initially, in step 269, the server process calls the implementation look-up function. The lookup function includes the step of mapping the object to the object servant. In other words, since the preparatory steps for invoking the target object 60 have been performed, a mapping of the target object 60 in memory is required for the target object to perform the requested service. Typically the mapping is found in memory allocated to the server process 55, however other memory can be used.

Thereafter, in step 271, the process receives the server object servant 54 in response to the call of step 269. At this point, the server object servant 54 is ready to be called with an invocation by the server process 55. After the server object servant 54 has been received, the server process 55 unmarshals the method and arguments from the invocation received in step 250. As will be appreciated by those skilled in the art, the method and arguments can be unmarshaled at any other appropriate point such as in step 250. For the sake of clarity, a "method", as used in this and other paragraphs and recited in step 273 of FIG. 8, is a procedure which can be performed by an object and is available to all other clients. As is well known by those of skill in the art, a server object is typically invoked with a requested method and the necessary arguments. The server object will then respond by performing the service requested by the client. The method unmarshaled in step 273 is a designation of the service requested of the target object, while the arguments are simply the parameters necessary (if there are any) for the target object to perform the requested service.

Now that the server object servant 54 is ready for a call and the method and arguments have been unmarshaled, the server process 55 will make a call to the server object servant 54 and receive the results of the call in a step 275. Once the results of the call are received, the server process marshals these results in a step 277. As discussed previously, the step of marshaling includes formatting information according to a network protocol in preparation for a network communication step. Consequently, in a step 279, the server process 55 returns the marshaled results of the object call to the object proxy 50 via the network. Note that step 279 is the server object servant counterpart to client step 222 of FIG. 6, wherein the server object proxy 50 receives and unmarshals the results of the object call.

The previous discussion has illustrated the invocation of an object in accordance with one embodiment with the present invention. Further, methods for managing collections of objects have also been disclosed. As will be apparent to those of skill in the art, the advantages provided by a distributed object operating environment which incorporates managing collections of objects through groups, co-activation, and co-process include efficient use of permanent memory space, computer processing power, and network bandwidth. A further embodiment of the present invention is found in an efficient implementation of fine grained objects called sub-objects. As will be appreciated by those of skill in the art, an object, including a distributed object, typically requires a certain amount of overhead resources such as minimum state and processing requirements. However, in many cases, this overhead is as costly, or even more costly, than the actual function(s) which the object can perform. Therefore, what is needed is an arrangement suitable for reducing the overhead, or "weight", of these fine grained objects.

Figure 9:
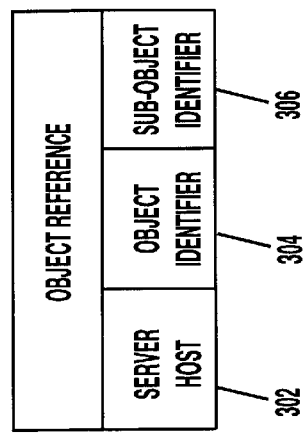
FIG. 9 is a pictorial illustration of an object reference including a sub-object identifier field in accordance with a further embodiment of the present invention.

Referring next to FIG. 9, an arrangement for utilizing "sub-objects" in a distributed object system will be described. Effectively, the use of sub-objects spreads the minimum overhead required onto a collection of objects. In this aspect, a single object can contain a collection of sub-objects. The collection of sub-objects shares everything about the object, such as the interface, location, exec.def, etc. Each sub-object has its own unique portion of data found within the object. In a preferred embodiment a sub-object identifier is incorporated into the object reference for distinguishing sub-objects within the target object. As will be appreciated, the size of this identifier can vary greatly depending upon the application. By way of example, identifier sizes of 1–32 bytes are appropriate for most applications.

To explain further, by way of example, sub-objects can be used to implement transient objects. That is, objects which have a short lifetime, often no longer than the process that creates them. Another general use would be fine grained objects that are almost all the same, but need a small amount of state to differentiate between each object. A specific example of this would be the cells of a spreadsheet. In each of these examples, rather than continuously activating and deactivating full weight objects, one permanent object containing a collection of sub-objects is created initially and maintained in a persistent state. Then, as need requires, these sub-objects can be independently addressed, accessed or used. The outcome may be faster operation, as the sub-objects are already created, and more efficient use of memory, as the sub-objects have less "weight" than full fledged objects.

One preferred object reference structure for implementing sub-objects will now be described with respect to FIG. 9. FIG. 9 shows an object reference 300 which includes a server host identifier 302, an object identifier 304, and a 16 bye sub-object identifier 306. The server host identifier 302 corresponds to the information required for a request to reach it's destination server host. This identifier can be specific enough to self-direct the request to the server host, or it may be information for a third entity (such as the ORB or a router) to interpret and act on. The object identifier 304 uniquely indicates which object (and hence which server process) is being called once the request reaches the destination server. Similar to the server host identifier 302, this information can include data as specific as the server process port number and target object information, or it can be information for a third entity such as the ORB to interpret and act on. The 16 bye sub-object identifier 306 is typically for use only by the target object. Once the target object receives a call, which includes the sub-object identifier 306, the sub-object can decipher which sub-object is being requested by way of the sub-object identifier 306. This identifier 306 is opaque to the ORB on both the client and the destination server, and is typically for use only by the target object.

In light of the above, it is apparent that the aforementioned structure may be utilized in an object call which followed the steps of the methods described in FIGS. 6–8. For example, in step 198 of FIG. 6, a client would call a server object to invoke an object method. In addition to designating the target object, the sub-object would be also be specified in the object reference. Steps 202–216 of FIG. 6 and all of the steps of FIG. 7 would be performed as described previously, without regard to the sub-object identifier 306. This is due to the fact that steps such as finding the server host, establishing a network connection with the ORB daemon, starting the server process, and establishing a network connection with the server process do not require knowledge of the sub-object identifier 306. However, in step 218 of FIG. 6, when the server object proxy marshals the target object identifier, the data specifying the sub-object would be included. Of course, the sub-object identifier 306 could change format in the marshaling or any subsequent step. However, as the essential information remains the same, in the following it will be referred to as the sub-object identifier.

Turning next to FIG. 8, steps 250–271 can be performed without regard to the sub-object identifier. This is because group activation and co-activation will typically not require information found in the sub-object identifier. Additionally step 273 may not use the sub-object identifier, beyond use in the sense that the sub-object identifier can be one of the arguments and may simply get passed onto the server object servant. However, if the server process required knowledge of sub-objects, this information can be interpreted and utilized once the sub-object identifier portion of the target object call is unmarshaled. Next, in step 275 of FIG. 8 the target object is called with the information including the sub-object identifier. Then, switching to the viewpoint of the target object, when the target object receives the call, it will know which sub-object to direct the call to based upon the sub-object identifier.

Although only a few embodiments of the present invention have been described, it should be understood that the present invention may be embodied in many other specific forms without departing from the spirit or scope of the invention. The object structure of FIG. 4 and the sample resultant framework of FIG. 5 may be varied greatly and yet fall within the scope of the present invention. For example, an object may be implemented with only a group designation but would still reap the benefits of sharing persistent memory, and therefore would have an advantageous structure. Indeed the system may be arranged to include any single one or any possible combination of the three described concepts of co-process, group, and co-activation. These multiple embodiments would reap the benefits of each enumerated aspect of managing collections of objects accordingly. Furthermore, the sub-object structure can be implemented without providing a mechanism for handling any of the other described arrangements or in conjunction with any one or more of the other described collection handling mechanisms.

As will be appreciated by those skilled in the art of distributed object systems, the underlying ideas behind the described methods of handling various collections of objects can be implemented in a wide variety of alternative embodiment, of which there far too many to discuss in detail. However, since the underlying philosophy has been described, various alternatives will be clear to those skilled in the art. By way of example, step 202 of FIG. 6, which determines if the server proxy has a connection with the ORB daemon, may be eliminated entirely in systems which require the client process to always establish a new connection with a server process when a call is made.

In another example, in step 251 of FIG. 8, the server process could unmarshal the method and arguments when it unmarshals the target object reference. Also in FIG. 8, the set of steps 252–258 may, under the appropriate circumstances, be switched in execution order with the set of steps 260–267. That is, the management of co-activation could occur before the management of group. Additionally, although many of the processes discussed herein have been described in terms of a sequential flow, as is well known to those skilled in the art, during implementation, it may be possible to perform some of the tasks concurrently or in different orders. Further, a computer process may have multiple threads of execution in which case the described operations may, in appropriate circumstances be divided among multiple threads of execution.

Still more embodiments can be found by examining the possible variations on the client-server models. While much of the detailed description focused upon a framework in which a client invoked a remote target object, other client-server models could be used as well. For example, the client may be an object, a process, or a non-object entity running within a process. Further, the described mechanisms for handling collections of objects maybe used in same host or even same process client server relationships. Therefore, the present examples are to be considered as illustrative and not restrictive, and the invention is not to be limited to the details given herein, but may be modified within the scope of the appended claims.

In the claims:

1. An object reference for use in a distributed object operating environment that contemplates the existence of a plurality of distributed objects, the object reference being arranged to permit the identification of the location of an associated object, the object reference including:

a host identifier indicative of a host computer system on which the associated object is stored;

an object identifier that may be used by the host computer system to locate the associated object therein;

a group identifier that is arranged to identify a group to which the associated object belongs, the group being a collection of objects which share an equivalent persistent state, wherein the shared equivalent persistent state is stored in a shared memory location on said host computer system;

a co-activation identifier that is arranged to identify a co-activation to which the associated object belongs, the co-activation being a collection of objects which are arranged to be activated under computer control at the same time; and a co-process identifier that is arranged to identify a co-process to which the associated object belongs, the co-process being a collection of objects which are to be activated under computer control within a single process executing on said host computer system.

2. A computer implemented method for managing a collection of objects during the invocation of a particular server object, said server object intended to reside in a computer controlled server process executing on a server computer system, the server object being identified by an object reference resident in a computer controlled client process executing on a client computer system, both the client computer system and the server computer system utilizing a distributed object operating environment having an object request broker, the method comprising the steps of:

determining under computer control whether a connection already exists between a client resident in said client process that initiates the invocation and the server object that is to be invoked; and establishing under computer control a connection between the client and the server object if there is not an existing connection, wherein when a connection between the client and the server object does not exist, the method further includes the computer controlled substeps of looking up a co-process for the server object and determining whether the co-process is active, wherein when the co-process is active, the active co-process is identified as said server process and a proper location to establish a connection.

3. A method as described in claim 2 wherein said client is a distributed object resident in said client computer process.

4. A computer implemented method for managing a collection of objects during the invocation of a particular server object, said server object intended to reside in a computer controlled server process executing on a server computer system, the server object being identified by an object reference resident in a computer controlled client process executing on a client computer system, the object reference including a) a host identifier indicative of the server computer system, b) an object identifier that may be used by the server computer system to locate the object therein, c) a group identifier that is arranged to identify a group to which the object belongs, the group being a collection of objects which share a singular instance of persistent data such that each object of the group has access to said singular instance of persistent data, d) a co-activation identifier that is arranged to identify a co-activation to which the object belongs, the co-activation being a collection of objects that are all to be activated immediately in response to any one of the co-activation objects being activated, and e) a co-process identifier that is arranged to identify a co-process to which the object belongs, the co-process being a collection of objects which are to be activated under computer control within a single process executing on said server computer, both the client computer system and the server computer system utilizing a distributed object operating environment having an object request broker, wherein during the invocation of the particular server object the method comprises:

determining under computer control whether a connection already exists between a client resident in said client process that initiates the invocation and the server object that is to be invoked; and establishing under computer control a connection between the client and the server object when there is not an existing connection, wherein when a connection between the client and the server object does not exist, the method further includes looking up a co-process for the server object and determining whether the co-process is active, wherein when the co-process is active, the active co-process is identified as said server process and a proper location to establish a connection.

5. A method as recited in claim 4 wherein the object reference that identifies the server object further comprises a sub-object field that may be used by a computer system to identify sub-objects within the server object.

6. A method as recited in claim 5 wherein said sub-object field is in the range of 1–32 bytes long.

7. An object reference as recited in claim 6 wherein said sub-object field is 16 bytes long.

8. A method as recited in claim 4 wherein when it is determined that the co-process for the server object is not active, the method further includes of activating the co-process and the activated co-process is identified as the server process and therefore a proper location to establish a communications connection.

9. A method as recited in claim 4 wherein:

the server computer system is separate from the client computer system; and the look up of the co-process for the server object and the determination of whether the co-process is active are performed by the server computer system.

10. A method as recited in claim 4 wherein the communications connection between the client and the server object is established through a server surrogate object resident in the client process and associated with the server object and a server servant object resident in the server process and associated with the server object and establishing a connection between the client and the server object effectively establishes a communications connection between the server surrogate object and the server servant object.

11. A method as recited in claim 4 further including:

determining under computer control whether the server object is part of a group that is inactive, wherein when the server object is part of a group that is inactive, a group activation function for the server object's group is performed by the server computer system; and determining under computer control whether the server object is part of a co-activation set that is inactive, wherein when the server object is part of a co-activation set that is inactive, all of the objects in the co-activation set are activated together by the server computer system.

12. A method as recited in claim 11 further comprising the step of calling under computer control the server object after the communications connection is established, wherein the call is initially received by the co-process for the server object and the server object group determining step and the server object co-activation set determining step are both handled by the co-process for the server object.

13. A method as recited in claim 12 wherein the server object group determining step includes at least one of the computer controlled substeps of:

determining whether the server object's group has been registered, wherein when it is determined that the server object's group has not been registered, it is further determined that the server object is not part of a group and there is no need to call the group activation function; and determining whether the server object's group is in an active group table stored in memory on the server computer system, wherein when it is determined that the server object's group is in the active group table, it is determined that the group is already active and that there is no need to call the group activation function.

14. A method as recited in claim 13 wherein the server object co-activation set determining step includes the computer controlled substep of determining whether the server object's co-activation set is identified in a co-activation table stored in memory on the server computer system, wherein when it is determined that the server object's co-activation set is identified in the co-activation table it is determined that the server object is already active and that there is no need to reactivate the server object or any of the other objects in the server object's co-activation set.

15. A method as recited in claim 14 further comprising the step of determining under computer control whether the server object is part of a group that is inactive, wherein when the server object is part of a group and that group is inactive, a group activation function for the server object's group is performed by the server computer system.

16. A method as recited in claim 15 further comprising the step of the client calling the server object after the connection is established, wherein the call is initially received by the co-process for the server object and the server object group determining is handled by the co-process for the server object.

17. A method as recited in claim 15 wherein the server object group determining step includes at least one of the computer controlled substeps of:

determining whether the server object's group has been registered, wherein when it is determined that the server object's group has not been registered, it is further determined that the server object is not part of a group and there is no need to perform the group activation function; and determining whether the server object's group is in an active group table stored in memory on the server computer system, wherein when it is determined that the server object's group is in the active group table, it is determined that the group is already active and that there is no need to perform the group activation function.

18. A method as recited in claim 17 wherein both the server object's group registration and the active group table are stored in computer system memory which is allocated to the server co-process, said system memory type being chosen from the group consisting of transient memory, persistent memory and a combination of transient and persistent memory.

19. A method as recited in claim 4 further including determining under computer control whether the server object is part of a co-activation set that is inactive, wherein when the server object is part of a co-activation set that is inactive, all of the objects in the co-activation set are activated together by the server computer system.

20. A method as recited in claim 19 further comprising the step of calling under computer control the server object after the communications connection is established, wherein the call is initially received by the co-process for the server object and the server object co-activation set determining step is handled by the co-process for the server object.

21. A method as recited in claim 20 wherein the server object co-activation set determining step includes the substep of determining under computer control whether the server object's co-activation set is identified in a co-activation table stored in memory of the server computer, wherein when it is determined that the server object's co-activation set is identified in the co-activation table it is determined that the server object is already active and that there is no need to reactivate the server object or any of the other objects in the server object's co-activation set.

22. A method as recited in claim 21 wherein the co-activation table is stored in computer system memory which is allocated to the server co-process, said system memory type being chosen from the group consisting of transient memory, persistent memory, and a combination of transient and persistent memory.

23. A method as described in claim 4 wherein said client is said client computer process.

24. A method as described in claim 23 wherein said client computer process is said server object co-process.

25. A method as described in claim 4 wherein said distributed object is the server object and said invocation is a recursive invocation.

26. A method as described in claim 4 further including:

determining under computer control whether the server object's group activation has been registered; and determining under computer control whether the server object is part of a group, wherein when it is determined under computer control that said group activation is not registered and that the server object is not part of a group, the group activation function is not performed.

27. A method as described in claim 4 further including determining under computer control whether the server object's group activation has been registered, wherein when it is determined under computer control that said group activation is registered, the group activation function is not performed.

28. A method as described in claim 4 further including determining under computer control whether the server object's group activation has been registered, and determining under computer control whether the server object's group is in the active group table, wherein when it is determined that said group activation is registered and that the server object's group is not in the active group table, the method further includes:

performing under computer control the group activation function; and writing under computer control the server object's group into the active group table.

29. A computer implemented method for managing a collection of objects during the invocation of a particular server object, said server object intended to reside in a computer controlled server process executing on a server computer system, the server object being identified by an object reference resident in a computer controlled client process executing on a client computer system, the object reference including a) a host identifier indicative of the server computer system, b) an object identifier that may be used by the server computer system to locate the object therein, c) a group identifier that is arranged to identify a group to which the object belongs, the group being a collection of objects which share a singular instance of persistent data such that each object of the group has access to the singular instance of persistent data, d) a co-activation identifier that is arranged to identify a co-activation to which the object belongs, the co-activation being a collection of objects that are all to be activated immediately in response to any one of the co-activation objects being activated, and e) a co-process identifier that is arranged to identify a co-process to which the object belongs, the co-process being a collection of objects which are to be activated under computer control within a single process executing on said server computer, both the client computer system and the server computer system utilizing a distributed object operating environment having an object request broker, wherein during the invocation of the particular server object the method comprises:

determining under computer control whether a connection already exists between a client resident in said client process that initiates the invocation and the server object that is to be invoked;

establishing under computer control a connection between the client and the server object when it is determined that the connection does not already exist, wherein when a connection between the client and the server object does not exist, the method further includes looking up a co-process for the server object and determining whether the co-process is active, wherein when the co-process is active, the active co-process is identified as said server process and a proper location to establish a connection;

determining under computer control whether the group is identified as active in an active group table stored on the server computer system; and when the group is not identified as active in the active group table, performing a group activation function and then identifying the group as active in the active group table.

30. A computer implemented method for managing a collection of objects during the invocation of a particular server object, said server object intended to reside in a computer controlled server process executing on a server computer system, the server object being identified by an object reference resident in a computer controlled client process executing on a client computer system, the object reference including a) a host identifier indicative of the server computer system, b) an object identifier that may be used by the server computer system to locate the object therein, c) a group identifier that is arranged to identify a group to which the object belongs, the group being a collection of objects which share a singular instance of persistent data such that each object of the group has access to the singular instance of persistent data, d) a co-activation identifier that is arranged to identify a co-activation to which the object belongs, the co-activation being a collection of objects that are all to be activated immediately in response to any one of the co-activation objects being activated, and e) a co-process identifier that is arranged to identify a co-process to which the object belongs, the co-process being a collection of objects which are to be activated under computer control within a single process executing on said server computer, both the client computer system and the server computer system utilizing a distributed object operating environment having an object request broker, wherein during the invocation of the particular server object the method comprises:

determining under computer control whether a connection already exists between a client resident in said client process that initiates the invocation and the server object that is to be invoked;

establishing under computer control a connection between the client and the server object when there is not an existing connection, wherein when a connection between the client and the server object does not exist, the method further includes looking up a co-process for the server object and determining whether the co-process is active, wherein when the co-process is active, the active co-process is identified as said server process and a proper location to establish a connection; and determining whether the co-activation is identified as active in an active co-activation table stored in the server computer system; and when the co-activation is not determined to be identified as active, performing an object activation function when one exists and identifying the co-activation as active in the active co-activation table.

31. A method for invoking a server object in a distributed object operating environment, the server object being located on a host in the distributed object operating environment, the method comprising:

initiating an invocation of the server object, the invocation being initiated by a client object running in a process located on the host, wherein initiating the invocation includes identifying the server object using an object reference;

calling a server object proxy associated with the server object, wherein the server object proxy is called by the process;

determining whether the server object proxy has an established connection with a server object servant located on the host; and performing a remote call to the server object when it is determined that the server object proxy has an established connection with the server object servant, wherein performing the remote call includes determining whether the server object is in an active co-activation table located in memory associated with the host, and when it is determined that the server object is not in the active co-activation table, performing the remote call further includes determining whether an object activation function for the server object exists.

32. A method as recited in claim 8 wherein the server object is located in the process along with the client object.

* * * * *